United States Patent
Kurczodyna et al.

(10) Patent No.: US 11,854,080 B2
(45) Date of Patent: Dec. 26, 2023

(54) SYSTEM AND METHOD FOR MATCHING ORDERS AND IMMUTABLE BLOCKCHAIN LEDGER FOR ALL CUSTOMER TRADING ACTIVITY WITH SETTLEMENT INTO THE BROKER DEALER ECOSYSTEM

(71) Applicant: Blackstar Enterprises Group, Inc., Boulder, CO (US)

(72) Inventors: Joe Kurczodyna, Boulder, CO (US); Matthew Baldwin, Boulder, CO (US)

(73) Assignee: Blackstar Enterprises Group, Boulder, CO (US)

( * ) Notice: Subject to any disclaimer, the term of this patent is extended or adjusted under 35 U.S.C. 154(b) by 0 days.

(21) Appl. No.: 17/457,158

(22) Filed: Dec. 1, 2021

(65) Prior Publication Data

US 2022/0261893 A1    Aug. 18, 2022

Related U.S. Application Data

(60) Provisional application No. 63/149,023, filed on Feb. 12, 2021.

(51) Int. Cl.
| | |
|---|---|
| G06Q 40/04 | (2012.01) |
| G06Q 20/40 | (2012.01) |
| G06Q 20/38 | (2012.01) |
| G06Q 40/12 | (2023.01) |
| G06Q 40/06 | (2012.01) |
| G06Q 40/10 | (2023.01) |
| G06Q 30/018 | (2023.01) |
| H04L 9/32 | (2006.01) |
| H04L 9/00 | (2022.01) |

(52) U.S. Cl.
CPC .......... *G06Q 40/04* (2013.01); *G06Q 20/389* (2013.01); *G06Q 20/3827* (2013.01); *G06Q 20/38215* (2013.01); *G06Q 20/405* (2013.01); *G06Q 40/06* (2013.01); *G06Q 40/10* (2013.01); *G06Q 40/12* (2013.12); *H04L 9/3297* (2013.01); *G06Q 30/018* (2013.01); *H04L 9/50* (2022.05); *H04L 2209/56* (2013.01)

(58) Field of Classification Search
CPC .............................. G06Q 40/00; G06Q 30/018
USPC ..................................................... 705/35–45
See application file for complete search history.

(56) References Cited

U.S. PATENT DOCUMENTS

| | | | | |
|---|---|---|---|---|
| 5,687,968 A | * | 11/1997 | Tarantino | A63F 3/081 463/16 |
| 6,098,051 A | * | 8/2000 | Lupien | G06Q 40/06 705/30 |
| 6,272,474 B1 | * | 8/2001 | Garcia | G06T 11/206 705/36 R |

(Continued)

*Primary Examiner* — Kirsten S Apple
(74) *Attorney, Agent, or Firm* — Haynes Boone LLP

(57) ABSTRACT

The present invention discloses a system and method of trading regulated equities with the SEC on an immutable blockchain, while also integrating with the rules and regulations of the existing brokerage ecosystem. In these systems and methods, customers are invited by at least one broker dealer to participate as a user on the digital trading platform to take a cash immutable action that comprises the placement of at least one of an order, bid or offer. The action, containing a digital price, is then entered into the digital trading platform, stored on the platform and used to facilitate a spot market transaction between a buyer and a seller.

21 Claims, 6 Drawing Sheets

(56) References Cited

U.S. PATENT DOCUMENTS

| | | | |
|---|---|---|---|
| 6,278,982 B1* | 8/2001 | Korhammer | G06Q 40/06 705/36 R |
| 6,356,911 B1* | 3/2002 | Shibuya | G01C 21/3446 707/999.005 |
| 6,721,715 B2* | 4/2004 | Nemzow | G06Q 40/00 705/41 |
| 7,062,361 B1* | 6/2006 | Lane | F25D 29/00 700/291 |
| 7,130,789 B2* | 10/2006 | Glodjo | G06Q 40/025 705/37 |
| 7,315,840 B1* | 1/2008 | Keith | G06Q 40/00 705/37 |
| 7,392,213 B2* | 6/2008 | Merkoulovitch | G06Q 40/08 705/36 R |
| 7,822,655 B1* | 10/2010 | LaQuinta | G06Q 40/00 705/37 |
| 7,831,494 B2* | 11/2010 | Sloan | G06Q 40/06 705/37 |
| 8,073,763 B1* | 12/2011 | Merrin | G06Q 40/04 705/37 |
| 8,126,794 B2* | 2/2012 | Lange | G06Q 40/04 705/36 R |
| 8,359,260 B2* | 1/2013 | Merrin | G06Q 40/04 705/37 |
| 8,417,618 B2* | 4/2013 | Milne | G06Q 40/04 705/37 |
| 8,755,943 B2* | 6/2014 | Wenzel | F24F 11/58 165/238 |
| 2002/0147671 A1* | 10/2002 | Sloan | G06Q 40/06 705/36 R |
| 2002/0147675 A1* | 10/2002 | Das | G06Q 30/08 705/37 |
| 2002/0194099 A1* | 12/2002 | Weiss | G06Q 40/06 705/36 R |
| 2003/0182224 A1* | 9/2003 | Horrigan | G06Q 40/00 705/37 |
| 2004/0024692 A1* | 2/2004 | Turbeville | G06Q 40/025 705/38 |
| 2005/0021447 A1* | 1/2005 | Lawrence | G06Q 40/00 705/37 |
| 2005/0080703 A1* | 4/2005 | Chiesa | G06Q 40/00 705/36 R |
| 2005/0124408 A1* | 6/2005 | Vlazny | G06Q 50/34 463/28 |
| 2006/0085321 A1* | 4/2006 | Staib | G06Q 30/0601 705/37 |
| 2008/0015871 A1* | 1/2008 | Eder | G06Q 40/00 705/348 |
| 2009/0106140 A1* | 4/2009 | De La Motte | G06Q 20/10 705/37 |
| 2009/0307149 A1* | 12/2009 | Markov | G06Q 40/06 705/36 R |
| 2010/0088210 A1* | 4/2010 | Gardner | G06Q 40/00 705/35 |
| 2011/0119166 A1* | 5/2011 | Steinberg | G06Q 30/04 705/34 |
| 2011/0125652 A1* | 5/2011 | Sato | G06Q 40/00 705/37 |
| 2012/0239453 A1* | 9/2012 | Osogami | G06Q 10/04 705/7.25 |
| 2012/0323753 A1* | 12/2012 | Norman | G06Q 40/00 705/37 |
| 2013/0080351 A1* | 3/2013 | Schneider | G06Q 40/04 705/36 R |
| 2013/0185187 A1* | 7/2013 | Vasinkevich | G06Q 40/04 705/37 |
| 2013/0275334 A1* | 10/2013 | Andersen | G06Q 40/06 705/36 R |
| 2014/0156517 A1* | 6/2014 | Argue | G07G 1/0081 705/40 |
| 2014/0201110 A1* | 7/2014 | Sato | G01R 21/133 705/412 |
| 2015/0058261 A1* | 2/2015 | Parikh | H04L 67/1001 705/412 |
| 2015/0310461 A1* | 10/2015 | Lee | G06Q 10/04 705/412 |
| 2015/0363866 A1* | 12/2015 | Depew | G06Q 30/0633 705/26.8 |
| 2016/0117784 A1* | 4/2016 | Hwang | G06Q 30/0283 705/412 |
| 2016/0148164 A1* | 5/2016 | Luk | G06Q 10/1095 705/7.19 |
| 2016/0196521 A1* | 7/2016 | Wada | G06Q 50/06 705/7.25 |
| 2018/0074523 A1* | 3/2018 | Cantrell | B64C 39/024 |
| 2018/0285970 A1* | 10/2018 | Snow | H04L 9/3247 |
| 2019/0132350 A1* | 5/2019 | Smith | G06F 21/577 |
| 2019/0311443 A1* | 10/2019 | Blades | H04L 9/3239 |
| 2019/0340689 A1* | 11/2019 | Gordon, III | G06Q 20/389 |
| 2020/0118068 A1* | 4/2020 | Turetsky | G06Q 20/02 |
| 2020/0151708 A1* | 5/2020 | Sui | H04L 9/14 |
| 2020/0151709 A1* | 5/2020 | Bryan | G06Q 20/3678 |
| 2020/0193752 A1* | 6/2020 | Burris | H04W 12/63 |
| 2020/0302468 A1* | 9/2020 | Karuppan | H04L 63/12 |
| 2021/0142302 A1* | 5/2021 | Anderson | G06Q 20/401 |
| 2022/0261925 A1* | 8/2022 | Kurczodyna | G06Q 20/389 |

* cited by examiner ered equities on an immutable blockchain while also integrating
SYSTEM AND METHOD FOR MATCHING ORDERS AND IMMUTABLE BLOCKCHAIN LEDGER FOR ALL CUSTOMER TRADING ACTIVITY WITH SETTLEMENT INTO THE BROKER DEALER ECOSYSTEM

CROSS REFERENCE TO RELATED APPLICATIONS

This application claims the benefit of U.S. Provisional Patent Application No. 63/149,023, filed on Feb. 12, 2021, which is incorporated herein by reference for all purposes.

TECHNICAL FIELD

The present disclosure relates to systems and methods for blockchain equity trading, and more particularly to providing digital trading platforms for trading SEC registwith the current broker dealer ecosystem.

BACKGROUND OF THE INVENTION

With the demise of the Over-The-Counter ("OTC") small cap brokerage firm, today's emerging companies have little choice but to raise private equity, crowdfund or participate with the (up to now) unregulated cryptocurrency market over the internet. In turn, these investment strategies limit the private investor to high-risk, non-liquid equity ownership with little or no diversification and no regulation or accountability. Accordingly, the present invention leverages the traditional world of public finance, including securities, options, registrations and SEC compliance, with the development and implementation of new technologies in the crypto digital equity world, i.e. blockchain technology.

Blockchain technology allows for a verifiable, immutable ledger that can continue to grow to a near infinite size, with little impact on scalability or performance. For example, Bitcoin has over 600 million transactions contained within a single ledger, as of February 2021. Any of those 600+ million transactions can be cryptographically verified and ensured to be legitimate and without modification. The present invention leverages this robust, battle-tested technology to develop a secure, efficient trading system that can reduce fraud, reduce cost, and unlock significant investment capital for publicly traded companies.

Accordingly, with the solid foundation of blockchain technology, the present invention discloses a novel digital trading platform. This platform allows investors to trade shares of a publicly traded company directly, while acting as their own market maker. Not only does this enhance volume and liquidity, but it also aids in creating a true cash market, parallel to a market where wholesale market makers can use their position to earn additional profits via speculation and arbitrage. This works by accounting for every bid, ask, trade, cancellation, or modification on the blockchain before any other action takes place. As a result, all activity is recorded in perpetuity, securely, allowing for anyone to validate the legitimacy of all information. Anyone, at any time, can validate a single transaction, or the system as a whole, in an efficient and cost-effective manner. And while the entire blockchain is visible, personally identifiable information is encrypted and only available to certificate holders, curbing front-running and other illegal trading activity. Certificate holders may include the customer's broker dealer, regulatory agencies, or other entities that have an intrinsic need for this information. In such cases the information will be limited to only what is necessary (e.g. a broker can only see info from their customers and nobody else).

Definitions that are applicable to the present invention:

Arbitrage: Arbitrage is the simultaneous purchase and sale of the same asset in different markets in order to profit from tiny differences in the asset's listed price. It exploits short-lived variations in the price of identical or similar financial instruments in different markets or in different forms.

Bitcoin: cryptocurrency traded on the Chicago Mercantile Exchange as a virtual commodity. Bitcoin is a decentralized crypto digital currency of a non-existent government.

Blockchain: a disintermediating technology where each transaction is cryptographically signed, and always appended to an immutable ledger, visible to all participants, and distributed across boundaries of trust. A major value proposition of blockchain technology is its ability to facilitate transactions among numerous participants in an environment of minimal trust involving only public-key cryptography and a consensus mechanism (e.g., governance). The ledger runs on a set of nodes, each of which may be under the control of a separate company, individual or organization. These nodes connect to each other in a dense peer-to-peer network so that no one node acts as a central point of control or failure. There is no need for a central intermediary, where one central database is used to rule transaction validity. A ledger is both a network and a database. It has rules and built-in security, and it maintains internal integrity and its own history. Once a ledger transaction has received a sufficient level of validation, some cryptography ensures that it can never be replaced or reversed. Transactions are secure, authenticated, and verifiable.

Cash Equity Market: only allows cash transactions. It connects a willing seller in possession of the securities offered to transact a cash sale to a willing buyer. The brokerage firm that holds the securities and cash verifies the customers possession before entering the platform and settles the trade through its clearing firm.

Certificate Authority: a certificate authority issues (and revokes) enrollment certificates for participating members in the blockchain network. Every operation in the blockchain must be signed cryptographically with X.509 certificates.

Clearing House: a financial institution formed to facilitate the exchange (i.e., clearance) of payments, securities, or derivatives transactions. The clearing house stands between two clearing firms (also known as member firms or participants). Its purpose is to reduce the risk of a member firm failing to honor its trade settlement obligations.

Crypto digital equity: the same as a paper equity but in digital form which has been transmitted and protected by cryptographic protocols.

Dark Pools: a privately organized financial forum or exchange for trading securities and some cryptocurrencies. The new generations of investors may not be aware of the existence of dark pools, but they may be avoided when trading registered shares over our blockchain platform.

Depository Trust & Clearing Corp (DTCC): an American post-trade financial services company providing clearing and settlement services to the financial markets. It performs the exchange of securities on behalf of buyers and sellers and functions as a central securities depository by providing central custody of securities.

Initial Coin Offering (ICO): we define the vast majority of coins or tokens as security derivatives. With the exception of Bitcoin, an ICO does not include the benefit of ownership.

ICOs are not tied to the monetary success of the company. These offerings may violate multiple provisions of the Securities Acts of 1933/34.

Internet Digital Offering: (IDO) The trading platform of the current invention is engineered to host indications of interest for potential initial or secondary future offerings. The trading platform of the current invention is engineered to host indications of interest for potential, initial or secondary, future offerings proposed by the Public Company using the Distributive Ledger Technology on a Blockchain.

Private and Public Blockchain Networks: In private blockchains, data blocks are digitally signed by one or more permitted validators, using an appropriate scheme to prevent minority control. For (private) institutions, immutability can only be grounded in the good behavior of other similar institutions, with whom they can sign a contract and sue if need be. So long as a majority of validator nodes are following the rules, the end result is stronger and cheaper immutability than any public cryptocurrency can offer. Unlike Bitcoin—a public, anonymous, cryptocurrency network—a private blockchain does not need proof-of-work (i.e., mining) to establish transaction validity.

Spot Market: Cash trading market concept wherein the last trade represents a cash buyer and a willing seller delivering registered shares. A spot market promotes shareholder confidence, produces liquidity from price movement or arbitrage, and offers low cost of entry and easy access to bid and offer prices for both shareholders and speculators.

Stock Transfer Agency: a company, usually a third party unrelated to stock transactions, that cancels the name and certificate of the shareholder or broker-dealer who sold the shares of stock and substitutes the new owner's name on the official master shareholder listing.

Token: a Utility token serves as future access to a product or service and can be best compared to a gift card or software license. A Security token constitutes an investment contract, where the main use-case, and the reason for the contributors to buy the tokens, is the anticipation of future profits in form of dividends, revenue share or (most commonly) price appreciation. Under the Howey Test, a transaction is a security if:

It is an investment of money (later cases have expanded this to include investments of assets other than money)

There is an expectation of profits from the investment

The investment of money is in a common enterprise

Any profit comes from the efforts of a promoter or third party

SUMMARY OF THE INVENTION

Accordingly, one object of the present invention discloses a system and method for trading equities on an immutable blockchain. In some preferred embodiments, customers are invited by broker dealers to participate as users on a digital trading platform to take at least one cash immutable action in a spot market, that is, where the financial instrument is traded for immediate delivery in exchange for cash. In these preferred embodiments, the cash immutable action comprises the placement of at least one of an order, bid or offer, and the at least one of an order, bid or offer is entered into the digital trading platform. Each order, bid or offer also comprises at least one digital price, which is immutably stored on the digital trading platform for subsequent access, review and/or management. In some preferred embodiments, a quote is then generated of the at least one digital price in order to facilitate at least one transaction on the digital trading platform. In some preferred embodiments, the transaction is regulated by the SEC and/or FINRA by providing these regulatory/governing bodies at least some access to the order flow and transaction history of users on the digital trading platform to ensure compliance. In some preferred embodiments, the at least one transaction is completed by integrating the transaction with an existing brokerage ecosystem, that is, for example, order entry processes, priority rules, and execution procedures. In some preferred embodiments, after completion of the at least one transaction, the broker dealer is charged a fee for facilitating the invitation of the customers to use the digital trading platform. In some preferred embodiments, the fee charged is a flat fee is not assessed for every transaction.

Currently, traditional exchange and broker-dealer trading systems are the only option for public companies. However, the present digital trading platform solves these problems by combining blockchain technology (currently used solely in the trading of digital assets operating outside the broker dealer, SEC and FINRA rules and regulators to fund and trade unregistered companies) with the SEC and broker dealer regulations used with the traditional exchanges for public companies. Moreover, the present disclosure does not allow short selling, and allows only cash immutable order flow. Therefore, market makers, traders and broker-dealers cannot mount a short attack on the digital trading platform. Investors can act as their own market maker by trading the spread between the bid and ask, loading the bid side and offer side with priced orders backed by cash and securities. Consequently, the present invention discloses a new way of trading registered shares of public companies on an immutable blockchain, while in compliance with SEC and broker dealer regulations, and all transactions come from and settle through the broker dealer ecosystem.

The present invention also discloses a digital trading platform that is engineered to host indications of interest for potential, initial or secondary future offerings proposed by a public company using the distributive ledger technology on a blockchain. These embodiments of the present invention allow companies to take indications of interest, for the offering from the public on a first come first serve basis. These embodiments include a method of facilitating a public offering for a company on an immutable blockchain comprising drafting a preliminary prospectus by the company interested in raising capital, collecting a list of company shareholders, and collecting a list of non-company shareholders who have met at least a minimum threshold for potential interest in investing in the company. Preferred embodiments include defining a class of potential investors, where the class is aggregated from the list of company shareholders or the identified non-company shareholders. The preliminary prospectuses are then distributed to at least some members of the identified class of potential investors, and a distribution list of the members of the class of potential investors who have received the preliminary prospectus on the immutable blockchain is recorded. Some preferred embodiments also include a time stamp of receipt, which is also recorded on the immutable block chain. Some embodiments also include the name, address and current investment status of the members of the class of potential investors. Preferred embodiments also include receiving an indication of interest from at least two members of the class of potential investors who received the preliminary prospectus, which are recorded on the immutable blockchain, and which are prioritized by the time that each was received. In these embodiments, the first indication of interest received has priority over the second indication of interest received. Preferred embodiments also include creating a list of prioritized members eligible to invest in the company based upon the recorded time and date of the indication of interest, and creating a fair distribution flow of the public offering by providing prioritized members a fair distribution of securities.

The present invention also discloses a system and method of recording corporate governance information about a public company on an immutable blockchain. These embodiments include a method of preparing for, and complying with, a SEC financial statement audit by recording corporate governance information on an immutable blockchain that reduce the time and cost of the audit. These preferred embodiments comprise drafting general corporate matters by a publicly traded company, and recording the general corporate matters on the immutable blockchain after creation or after a material change, wherein each recording comprises a time stamp of receipt, and wherein each recording cannot be subsequently manipulated or changed. These preferred embodiments also include drafting financial and accounting matters by the publicly traded company, and recording the financial and accounting matters on the immutable blockchain at least every 30 days, wherein each recording comprises a time stamp of receipt, and wherein each recording cannot be subsequently manipulated or changed. These preferred embodiments include drafting tax filing maters by the publicly traded company, and recording the tax filing matters on the immutable blockchain within the time requirements specified by the tax deadlines or after a material change, wherein each recording comprises a time stamp of receipt, and wherein each recording cannot be subsequently manipulated or changed. These preferred embodiments also include drafting SEC filing matters by the publicly traded company, and recording the SEC filing matters on the immutable blockchain within the time requirements specified by the SEC deadlines or after a material change, wherein each recording comprises a time stamp of receipt, and wherein each recording cannot be subsequently manipulated or changed. These embodiments include completing SEC auditor due diligence documents by the publicly traded company, and recording the SEC auditor due diligence documents on the immutable blockchain in preparation of an SEC audit, wherein each recording comprises a time stamp of receipt, and wherein each recording cannot be subsequently manipulated or changed. These preferred embodiments also include creating a list of certificate holders that have at least some access to the recorded information about the publicly traded company on the immutable blockchain, designating an SEC auditor as a certificate holder, and providing at least some of the recorded information on the immutable blockchain to the SEC auditor for completion of a SEC financial statement audit of the public company. The auditor is provided immutably verifiable recorded company information that is time-stamped and that cannot be subject to subsequent data entry manipulation.

The Summary is neither intended nor should it be construed as being representative of the full extent and scope of the present disclosure. The present disclosure is set forth in various levels of detail in the Summary, as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. Further details and other features will become apparent after review of the following Detailed Description and accompanying drawing figures.

BRIEF DESCRIPTION OF THE DRAWINGS

Example embodiments are illustrated in referenced figures of the drawing. It is intended that the embodiments and figures disclosed herein are to be considered illustrative rather than limiting.

Figure 1:
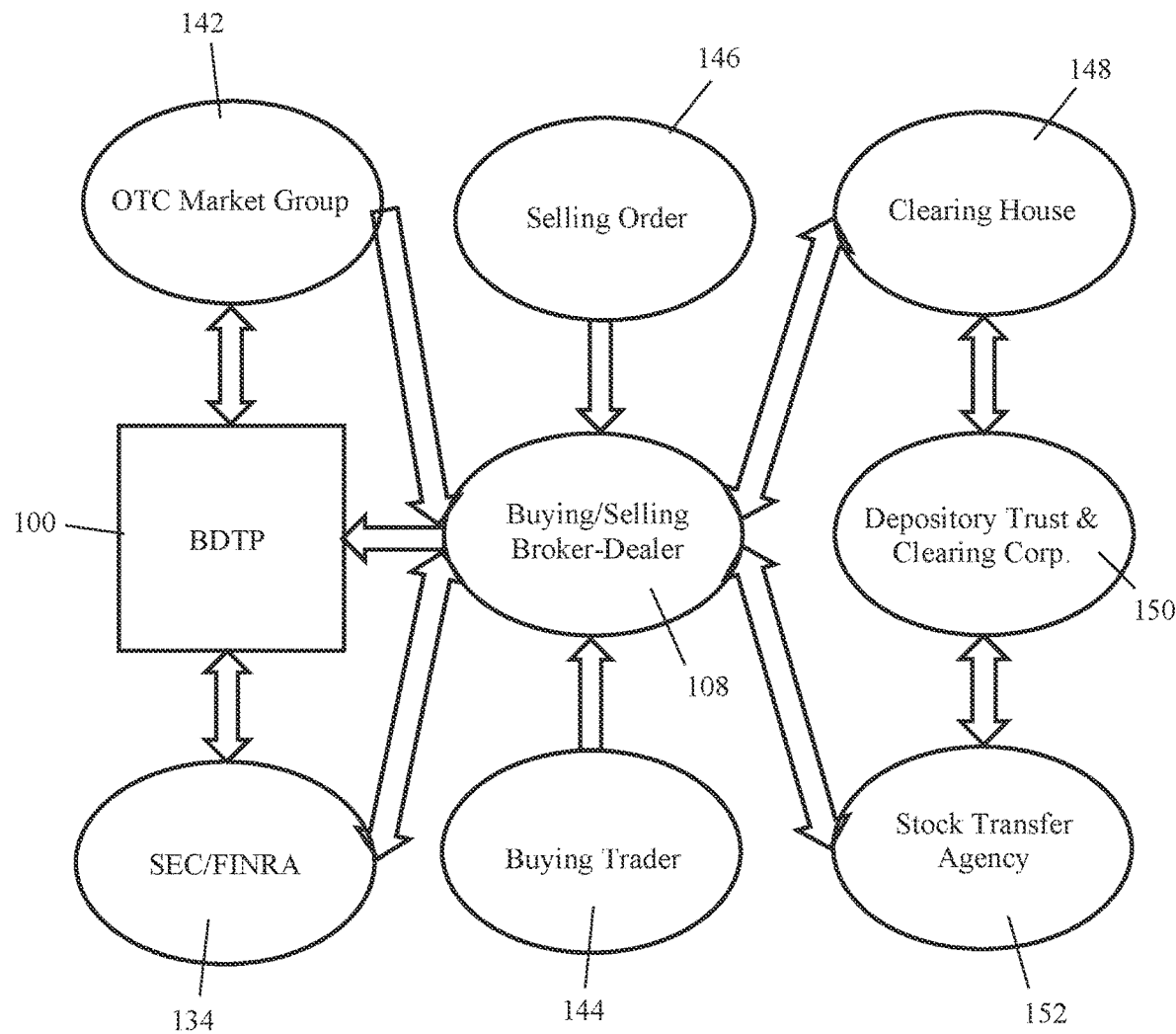
FIG. 1 discloses a flowchart describing how the digital trading platform integrates with the various governing bodies and the broker dealer ecosystem according to a preferred embodiment.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

As shown in FIGS. 1-4, preferred embodiments disclose a digital trading platform 100 system for providing trading or registered equities 102, on an immutable blockchain 104.

In some preferred embodiments, customers 106 are invited by broker dealers 108 to participate as users on the digital trading platform 100 to take at least one action 110 that is cash immutable 112. In some preferred embodiments, that at least one action is taken in a spot market 114, that is, where the financial instrument is traded for immediate delivery in exchange for cash. In these preferred embodiments, the cash immutable action 110, 112 comprises the placement of at least one of an order 116, bid 118 or offer 120, and the at least one of an order 116, bid 118 or offer 120 is entered into the digital trading platform 100. Each order 116, bid 118 or offer 120 also comprises at least one digital price 122, which is immutably stored 124 on the digital trading platform 100 for subsequent action 126, if necessary, such as, for example, access, review and/or reference. In some preferred embodiments, a quote 128 is then generated of the at least one digital price 130 in order to facilitate at least one transaction 132 on the digital trading platform 100. In some preferred embodiments, the transaction 132 is regulated by at least one regulatory/governing entity 134 such as the SEC and/or FINRA by providing these regulatory/governing bodies 134 at least some access 136 to the order flow and transaction history of users on the digital trading platform 100 to ensure compliance. In some preferred embodiments, the at least one transaction 132 is completed by integrating the transaction with an existing brokerage ecosystem 138, that is, for example, order entry processes, priority rules, and execution procedures. In some preferred embodiments, after completion of the at least one transaction 132, the broker dealer 108 is charged a fee 140 for facilitating the invitation of the customers 106 to use the digital trading platform 100. In some preferred embodiments, the fee 140 charged is a flat fee and is not assessed for every transaction 132. In some embodiments, the broker dealer 108 is charged a fee 140 regardless of whether the invited customer 106 places an order 116, bid 118 or offer 120.

In various embodiments, users of the disclosed digital trading platform 100, i.e. the investing public and more particularly the lower market cap public companies and their respective potential investors, can use the disclosed digital trading platform 100 to trade registered equities 102 for cash (i.e. spot market 114) using blockchain technology 104, while storing and recording the trading activity using an immutable blockchain ledger 124. In current systems and methods, and unlike the disclosed digital trading platform, market makers and various middle-men can front run order flow or crush companies by selling short stock, which can depress the stock price and that company's ability to attract future capital. These actions absorb and deflect precious investment support for the companies that need it most. These pitfalls are not found in the present digital trading platform because order flow is immutable on the blockchain 104 and is further prioritized by time of order placement. Thus, for example, bad actors attempting to front run customer trades in the broker-dealer ecosystem would be easily visible to regulatory bodies 134. By eliminating this inefficiency, smaller companies, like many OTC companies, can increase their ability to raise much needed funds.

In some preferred embodiments, the disclosed digital trading platform 100 uses Amazon Quantum Ledger Database, a blockchain framework from Amazon Web Services ("AWS") and uses the AWS Cloud for transaction data storage. In these preferred embodiments, the digital trading platform offers a web-based interface for trading transactions as well as an Application Programming Interface (API) that directly accesses all immutable transactions stored on the digital trading platform. The cash trading market concept found on the digital trading platform 100 is similar to the spot market in commodities trading wherein the last trade represents a cash buyer and a willing seller delivering registered shares. This model, i.e. spot market 114, promotes shareholder confidence, produces liquidity from price movement or arbitrage, and offers low cost of entry and easy access to bid and offer prices for both shareholders and speculators. An additional benefit to the spot market 114 is that it is designed to be decentralized, shielding it from malicious short selling that is present in other parallel markets. As part of the spot market 114, order flow is only transparent to regulators and the Company (the issuer of the securities) in real time on the blockchain 104. Some preferred embodiments implement a private blockchain with privately appointed Certificate Holders that can access the blockchain (e.g. regulatory agencies). In these embodiments, the system records all activity using an immutable blockchain ledger. Thus, because of these built-in characteristics, these systems will help renew confidence in trading shares of publicly traded companies, and more specifically of OTC companies, over time.

FIG. 1 illustrates how the disclosed digital trading platform 100, (in this embodiment referred to as the Blackstar Digital Trading Platform "BDTP"), is integrated with the existing FINRA and SEC regulated brokerage ecosystem to trade registered equities 102 in some preferred embodiments. In this preferred embodiment, the digital trading platform 100 is also integrated with a quotation system 142 (in this embodiment OTC Market Group, however in other embodiments it could also include different broker dealer quoting systems), in order to quote the current bid, current ask, last trade and volume. In this preferred embodiment, a buying and selling broker dealer 108 invites its customers 106 to participate as users on the digital trading platform 100 as buyers producing buying orders 144 and/or sellers producing selling orders 146 to buy and/or sell registered equities 102. The broker dealers 108 comply with all governing entity 134 regulations, such as, for example, FinCen and Exchange regulations, KYC and FinCen rules, IRS tax reporting. In some preferred embodiments, orders 116, bids 118, and offers 120 are entered in the digital trading platform 100 (like, for example, a specialist's order book) either directly by the broker dealer 108 or by the users through trading software supplied by the broker dealer 108. The digital trading platform 100 records all transactions 132, which are immutably stored 124. In these preferred embodiments, the broker dealer 108, quotation system 142 and the governing bodies 134, i.e. SEC and FINRA, have complete and transparent access to the data stored in the digital trading platform 100. In some preferred embodiments, the digital trading platform offers the regulatory bodies, like FINRA, a single data interface and consolidated history of the transactions 132.

Figure 2:
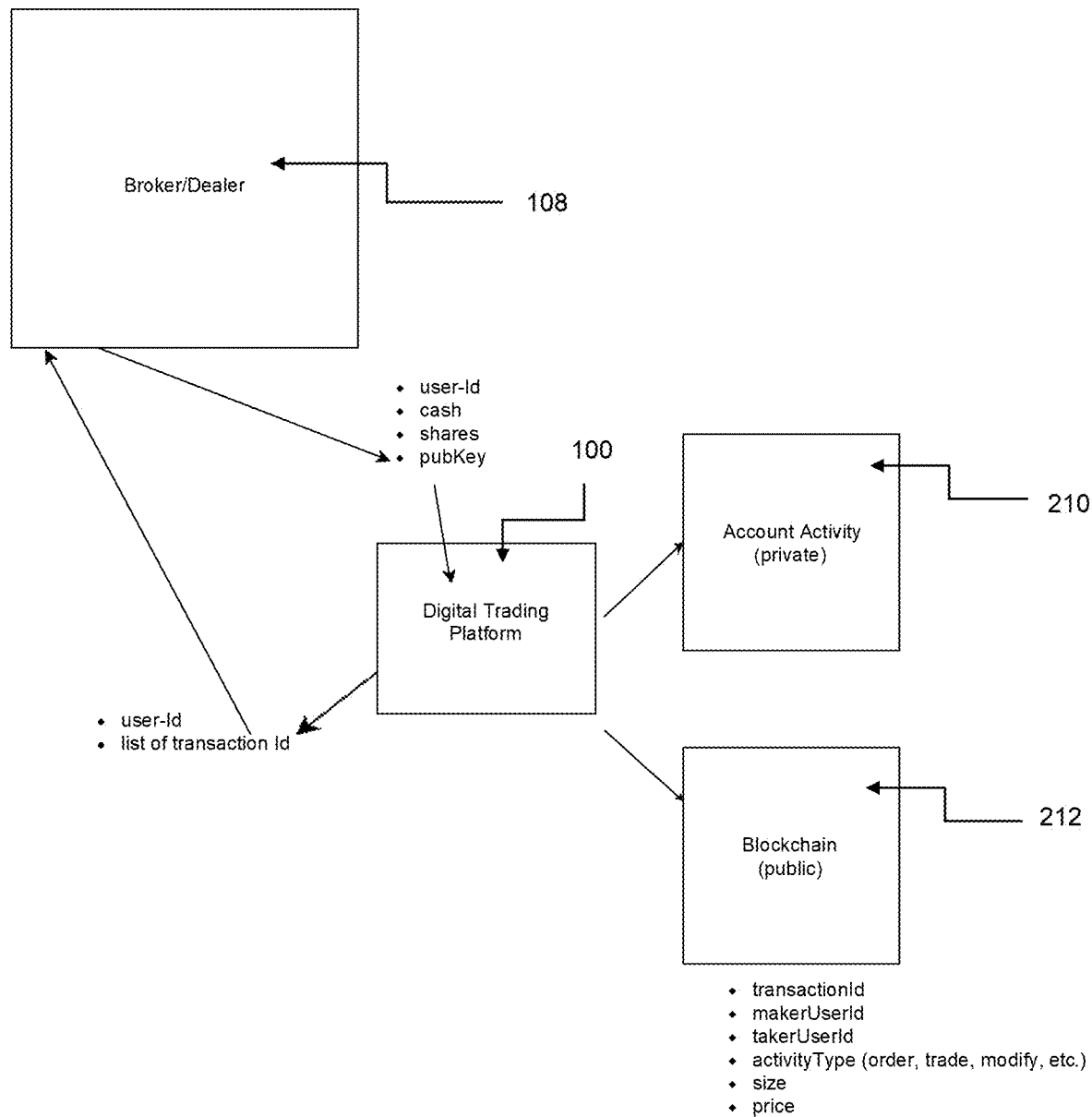
FIG. 2 discloses a flowchart describing how the digital trading platform integrates with the broker dealer ecosystem according to a preferred embodiment.
Figure 3:
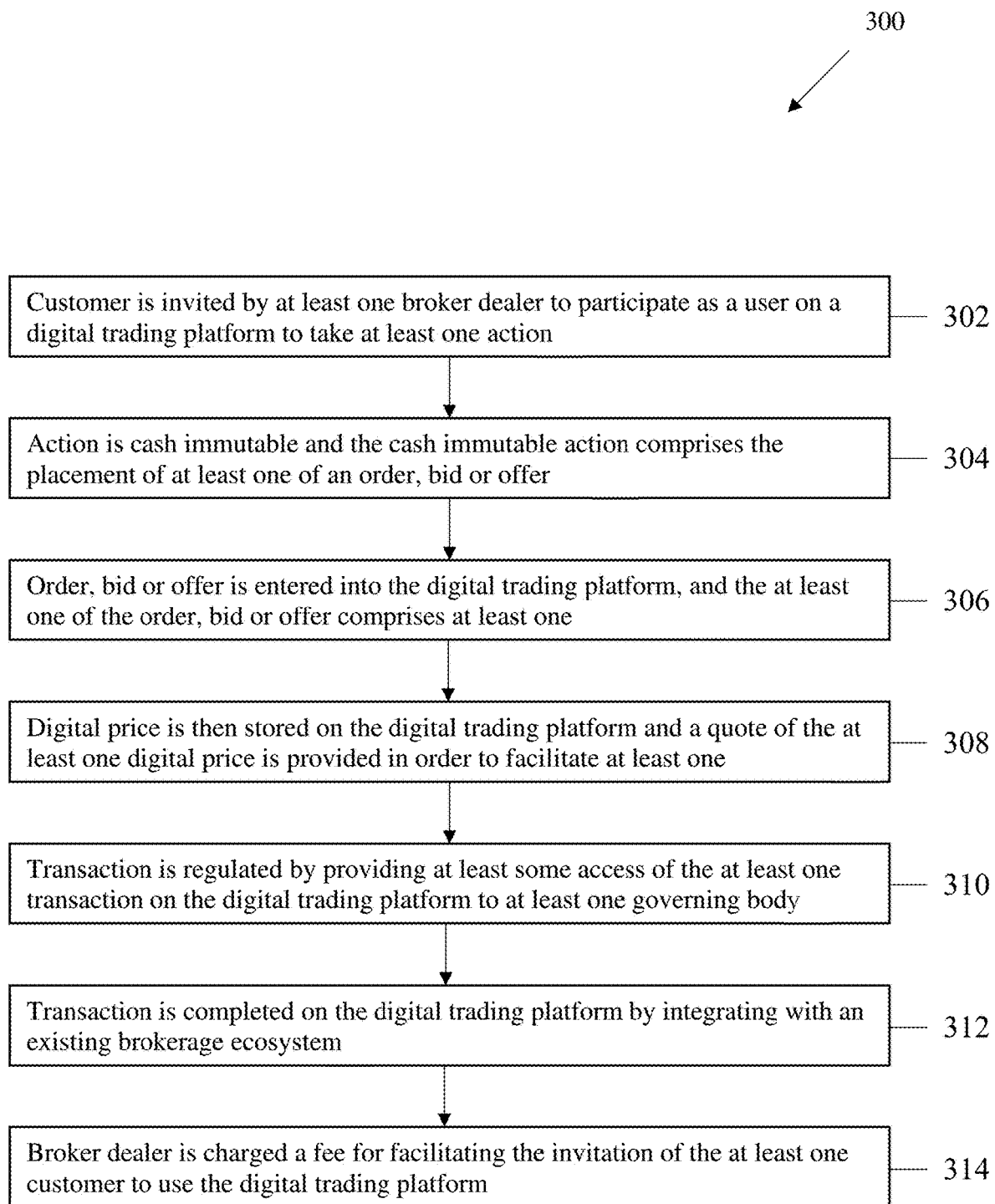
FIG. 3 discloses a method of trading registered equities on an immutable blockchain according to a preferred embodiment.
Figure 4:
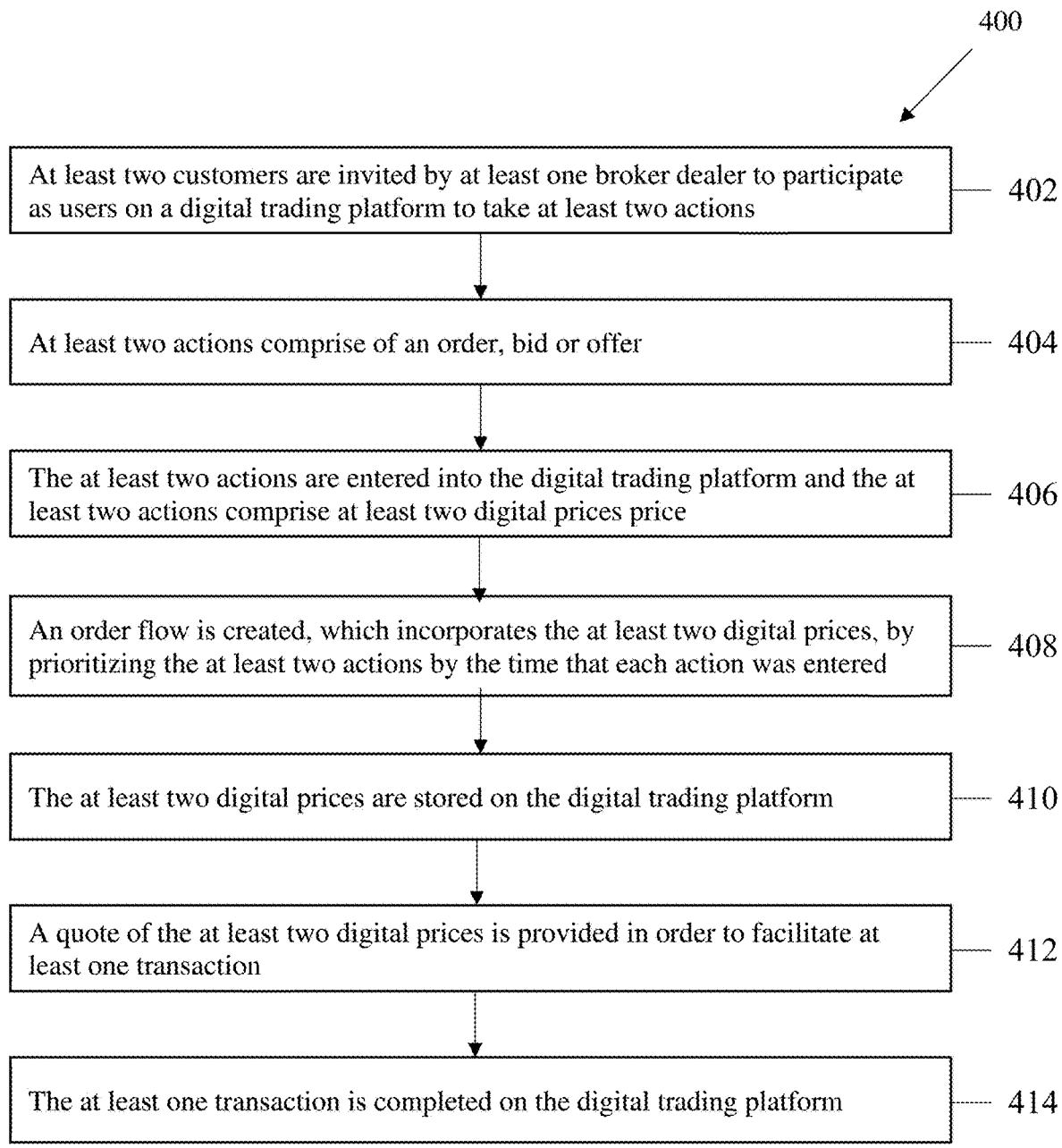
FIG. 4 discloses a method of trading registered equities on an immutable blockchain according to a preferred embodiment.
Figure 5:
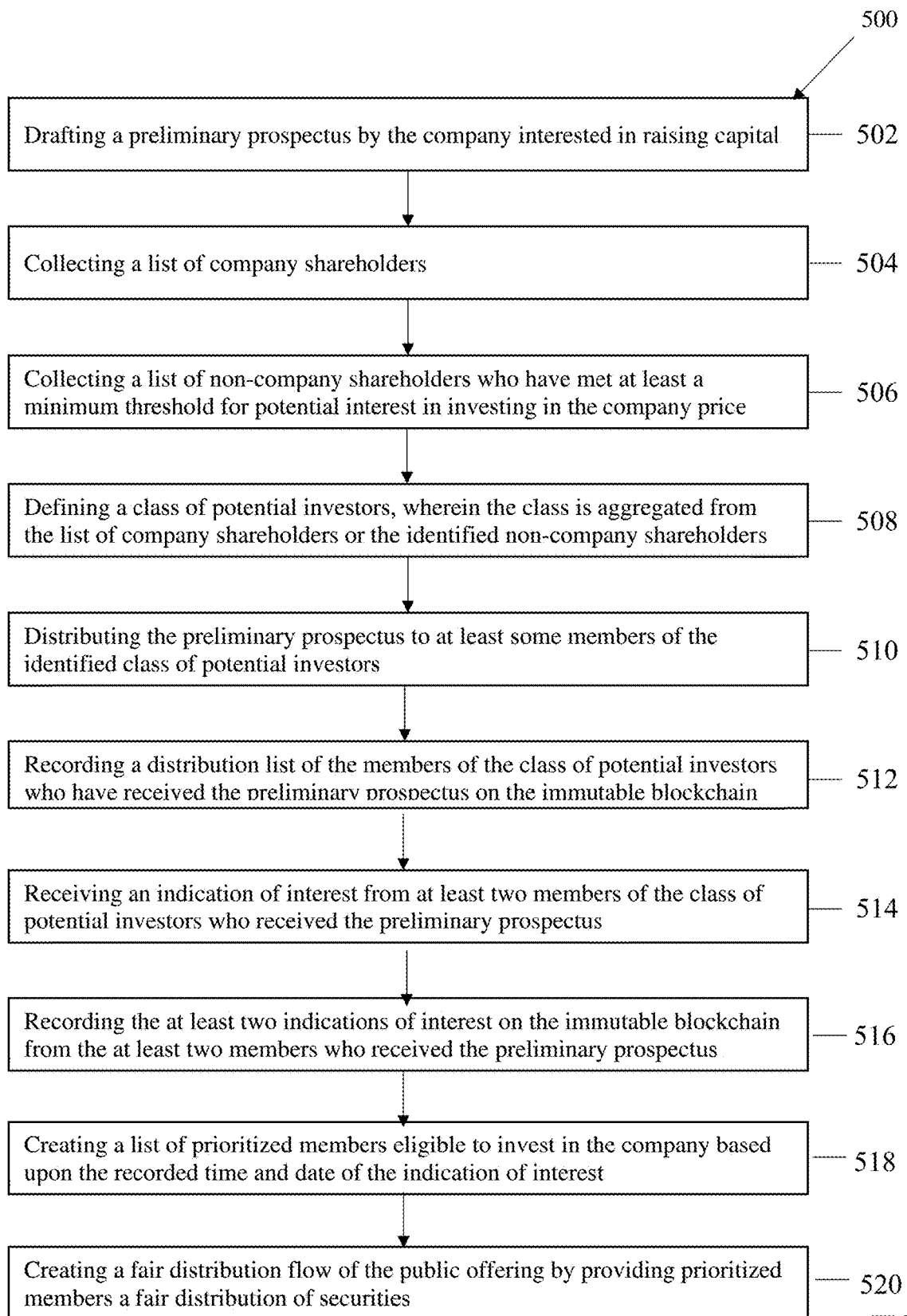
FIG. 5 discloses a method of facilitating a public offering for a company on an immutable blockchain according to a preferred embodiment.
Figure 6:
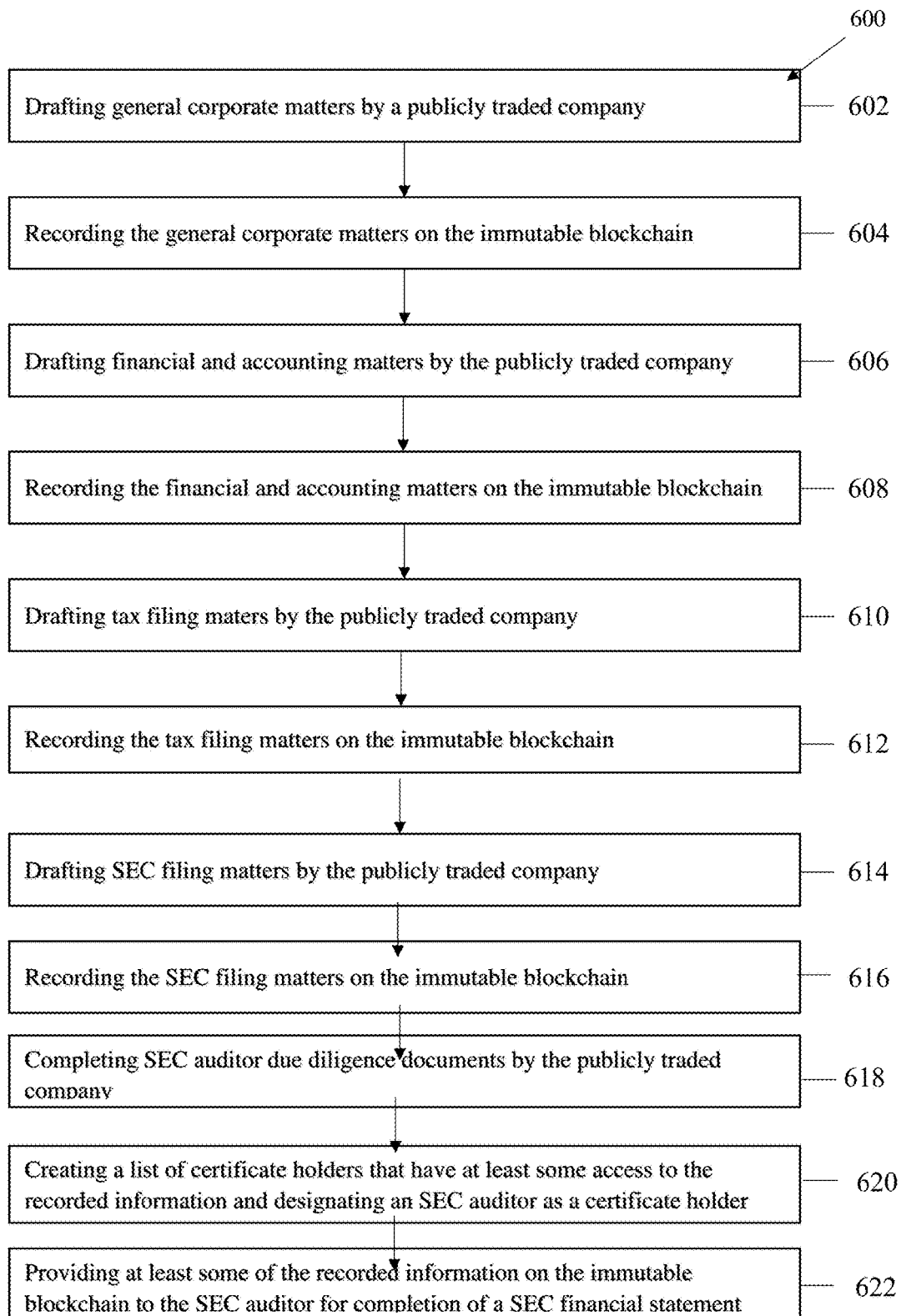
FIG. 6 discloses a method of preparing for, and complying with, a SEC financial statement audit by recording corporate governance information on an immutable blockchain, according to a preferred embodiment.

As described in more detail in FIG. 2, some preferred embodiments describe a system in which certain information is publicly available, while other information is only accessible by predetermined parties. For example, when broker dealer 108 registers a new account for a customer to trade on the digital trading platform 100, the platform 100 will generate a user-ID with a random value that only the broker dealer 108 can link to a customer. Other customer specific information, such as cash or shares brought by that customer to trade on the platform 100 may later become publicly available, depending upon how/if the cash and/or shares brought by the customer to the platform 100 are traded on the on the platform and recorded on the immutable blockchain 124. When the broker/dealer registers a customer account, an asymmetric public key is provided to encrypt the personally identifiable information (userId) on the blockchain. Only the broker/dealer will possess the corresponding private key necessary to decrypt this information and determine which transactions are associated with their customer's accounts. A single broker dealer can only decrypt userIds for its own accounts, not accounts that belong to a different broker/dealer. Additionally, a random salt value will be appended to the data prior to encryption to prevent a third party knowing which transactions are associated with a given user. The publicly available information 212, which is recorded on immutable blockchain 124, may include a publicly visible, randomly generated, transaction-ID, an encrypted Maker User ID, an encrypted Taker User ID, the activity type, such as, for example, an order, trade, modify, etc., a trade size, for example the number of shares bought or sold, and the price(s) associated with a transaction 132. At the end of the trading day, information from the digital trading platform 100 is transferred back to the broker dealer 108 for reconciliation, such as user-ID and a list of transaction ID. The reconciliation instruction will contain a specific number of shares and/or cash that need to be transferred between each broker/dealer. All transaction data will be aggregated in order to reconcile broker/dealer accounts with the least number of transactions necessary.

In other preferred embodiments, involving multiple broker dealers bringing customers to trade on the platform 100, an example is as follows:
User 1, invited by broker dealer 1, brings 1000 shares of stock A and $1000 of cash to trade on the digital trading platform 100. User 1 is assigned a unique user ID that is known to broker dealer 1. Contemporaneously, User 2, invited by broker dealer 2, also brings 1000 shares of Stock A and $1000 of cash to trade on the digital trading platform 100. During the trading day, User 1 places an order to sell 100 shares of Stock A at $3 per share, which is recorded on the immutable blockchain 124. Subsequently, User 2 places an order to buy 100 shares of Stock A at market price, which is also recorded on the immutable blockchain 124. The trade is then executed, where at the end of the day User 1 owns 900 shares of Stock A and $1300 in cash, and User 2 owns 1100 shares of Stock A and $700 in cash. The transaction 132 is recorded on the immutable blockchain 124. At the end of the day, the list of transactions 132 involving User 1 are sent to broker dealer 1 for verification and the list of transactions 132 involving User 2 are sent to broker dealer 2 for verification. After verification, instructions are sent to broker dealer 1 to send 100 shares of Stock A to broker dealer 2 and instructions are sent to broker dealer 2 to send $300 to broker dealer 1. The transaction 132 is then finalized outside of the digital trading platform 100 and within the traditional broker dealer ecosystem 138.

In some preferred embodiments, all exchange activity (i.e. transactions 132) will be visible to the public, with the exception of information that can identify an individual across transactions 132. In these embodiments, any such information (account Id, for example) is stored encrypted, using a broadcast encryption algorithm, and thus, for example, only visible to the customer's broker dealer 108 and regulatory bodies 134. In these embodiments, other users, while being able to see all transactions 132, will not be able to distinguish exactly who an individual transaction belongs to. In some preferred embodiments, the encryption algorithm allows for multiple encryption keys to operate simultaneously and independently of each other. In preferred embodiments, an uninterested third party is the only party to (1) have access to all transaction information and (2) hold authority to revoke the plurality of encryption keys. In other preferred embodiments, the broker dealer holds sole access to the transaction information and access to employment and revocation of the encryption keys.

In preferred embodiments, it is the intent of the digital trading platform 100 not to replace the market-makers but to work in parallel with them in the brokerage ecosystem 138 representing a cash spot market 114. In these preferred embodiments, once the transaction 132 has been completed between buyer 144 and seller, the broker dealer 108 integrates with a traditional clearing house 148, depository trust and clearing corporation 150 and transfer agency 152 to finalize the transaction 132.

The present invention also discloses a method 300 of trading equities on an immutable blockchain. In some preferred embodiments, at least one customer is invited by at least one broker dealer to participate as a user on a digital trading platform to take at least one action 302. In some preferred embodiments, the at least one action is cash immutable, and the cash immutable action comprises the placement of at least one of an order, bid or offer 304. In these embodiments, the at least one of an order, bid or offer is entered into the digital trading platform, and the at least one of the order, bid or offer comprises at least one digital price 306. The at least one digital price is then stored on the digital trading platform and a quote of the at least one digital price is provided in order to facilitate at least one transaction 308. In these embodiments, the at least one transaction is regulated by providing at least some access of the at least one transaction on the digital trading platform to at least one governing entity, such as, for example the SEC or FINRA 310. In these embodiments, the at least one transaction is completed on the digital trading platform by integrating with an existing brokerage ecosystem 312, and the at least one broker dealer is charged a fee for facilitating the invitation of the at least one customer to use the digital trading platform 314.

In other preferred embodiments, the invention discloses a method 400 of trading registered equities on an immutable blockchain whereas at least two customers are invited by at least one broker dealer to participate as users on a digital trading platform to take at least two actions 402. In these embodiments, the at least two actions comprise of an order, bid or offer 404. In these preferred embodiments, the at least two actions are entered into the digital trading platform and the at least two actions comprise at least two digital prices 406. In these embodiments, an order flow is created, which incorporates the at least two digital prices, by prioritizing the at least two actions by the time that each action was entered into the digital trading platform, where the first action entered into the digital trading platform has priority over the second action entered into the digital trading platform 408. In these embodiments, the at least two digital prices are stored on the digital trading platform 410, a quote of the at least two digital prices is provided in order to facilitate at least one transaction 412, and the at least one transaction is completed on the digital trading platform 414.

In some embodiments, the method also includes adhering to least one order entry process when the digital trading platform is integrating the existing brokerage ecosystem. Some preferred embodiments also include adhering to the priority rules and execution procedures when integrating with the existing brokerage ecosystem. To facilitate efficiency, some preferred embodiments also include providing at least one governing entity (i.e. SEC and/or FINRA) with a single data interface and consolidated history of the at least one transaction on the digital trading platform. In some of these preferred embodiments, the governing bodies are provided complete access to the transaction history of the digital trading platform in order to ensure that the broker dealer is in compliance with the applicable exchange and reporting rules and regulations. In some preferred embodiments, the immutable blockchain technology used in or associated with the digital trading platform prevents order manipulation, such as, for example, front running orders. In most preferred embodiments, the digital trading platform operates on a cash spot market. In these embodiments, the spot market is designed to be decentralized, shielding it from short selling that is present in other parallel markets. As part of the spot market, order flow is only transparent to regulators and the issuer of the securities in real time on the blockchain. In these embodiments, the spot market of the digital trading platform does not replace the market-makers, but rather works in parallel with them in the brokerage ecosystem. The price differential in the parallel markets creates the opportunity for arbitrage, which creates extra liquidity for a buyer and/or seller to get in and out of the market.

At the end of a transaction, some preferred embodiments also include charging the broker dealer a fee, and in some cases a fixed fee, for facilitating the at least one transaction on the digital trading platform. In other preferred embodiment, no fee may be charged to the broker dealer, or the broker dealer may be compensated in other ways.

In some preferred embodiments, the digital trading platform 100 of the current invention is engineered to host indications of interest for potential, initial or secondary future offerings proposed by a public company or soon to be public company using the distributive ledger technology on a blockchain. In the U.S., there are over 27,000 public companies and less than 1000 broker dealers that have the client capacity and time to fund only a few deals per year. Thus, the embodiments of the present invention engineered to host indications of interest facilitate all public companies on the platform to reach out to current and old shareholders and, through a public announcement, distribute a preliminary prospectus, and take indications of interest for the offering from the public on a first come first serve basis. Current systems and methods involving initial and secondary offerings are replete with manipulation related to investor access. Embodiments of the current invention prevent such manipulation because the disclosed systems and methods facilitate a public offering on an immutable blockchain that prioritizes interested investors on a first-come, first serve basis. That is, an investor who shows timely interest in an offering will have access, which is verifiable on the blockchain, to a fair distribution of the requested securities. In some preferred embodiments, once the company has sufficient interest in the offering, it can choose to engage a broker dealer to underwrite and then qualify all customers on the list. In some preferred embodiments, regulatory rules, i.e. SEC and FINRA, apply to the process whether the broker dealer or the company does a self-underwriting. The platform 100 can then facilitate a fair distribution to the public.

Some preferred embodiments also include a method 500 of facilitating a public offering for a company on an immutable blockchain comprising drafting a preliminary prospectus by the company interested in raising capital 502, collecting a list of company shareholders 504, and collecting a list of non-company shareholders who have met at least a minimum threshold for potential interest in investing in the company 506. In some embodiments, the list of the company shareholders will include both holders of common and preferred shares in the company. Some embodiments identify shareholders in book entry form, while other embodiments identify shareholders in certificated form. In some embodiments, a former investor in the company qualifies as meeting the minimum threshold for showing potential interest in the company and is eligible to receive the preliminary prospectus. A former investor could include a former owner of company stock or equity, or a day/swing trader who may enter in and out of company stock on a daily or weekly basis.

Preferred embodiments include defining a class of potential investors, where the class is aggregated from the list of company shareholders or the identified non-company shareholders 508. The preliminary prospectuses are then distributed to at least some members of the identified class of potential investors 510, and a distribution list of the members of the class of potential investors who have received the preliminary prospectus on the immutable blockchain is recorded 512. Some preferred embodiments also include a time stamp of receipt, which is also recorded on the immutable blockchain. Some embodiments also include the name, address and current investment status of the members of the class of potential investors. Preferred embodiments also include receiving an indication of interest from at least two members of the class of potential investors who received the preliminary prospectus 514, which are recorded on the immutable blockchain, and which are prioritized by the time that each was received 516. In these embodiments, the first indication of interest received has priority over the second indication of interest received. Preferred embodiments next include creating a list of prioritized members eligible to invest in the company based upon the recorded time and date of the indication of interest 518, and creating a fair distribution flow of the public offering by providing prioritized members a fair distribution of securities 520.

In preferred embodiments, the described method includes members having to disclose their levels of interest by monetary amount. In some of these embodiments, which comprise a set threshold of capital to raise, interested investors are awarded shares on a first come first serve basis until that threshold is met. For example, if a company wants to raise $10 million in an offering, investor A, who shows interest in the offering for $7 million on Monday, and investor B, who shows interest in the offering for $3 million on Tuesday, would be awarded their respected levels of interest. Under this example, investor C, who shows interest in the offering for $5 million on Wednesday, would not be entitled to any shares. Other embodiments of the present invention would look to discount the available number shares to investors A and B, and would allow investor C to have access to a discounted level of interest.

In other embodiments, the amount of capital (or range) a company intends to raise and the amount a single investor can contribute is included in the preliminary prospectus. For example, a company intending to raise $10 million in an offering could limit a single investors investment amount to $50,000, made available to the first 200 qualified individuals who show interest. In some embodiments, a date/deadline may be included in the opportunity to invest in an offering. In some embodiments, an investment minimum may act as a way to prioritize qualified investors. In other embodiments having no investment minimum, the timing of the expressed indication of interest, in relation to other interested investors, is the only method in which prioritization is measured.

In some preferred embodiments, the platform 100 of the current invention is engineered to host corporate governance information of a publicly traded company in order to prepare for, and comply with, a SEC financial statement audit. By storing specifically relevant information on the immutable blockchain 124, public companies can reduce both the cost and time spent on preparing for an audit. Storing information in this way can also give assurance to the auditor that information is accurate and has not been backdated or manipulated. These preferred embodiments include a method 600 of preparing for, and complying with, a SEC financial statement audit by recording corporate governance information. These preferred embodiments include drafting general corporate matters by a publicly traded company 602 and recording the general corporate matters on the immutable blockchain after creation or after a material change 604. In these embodiments, each recording comprises a time stamp of receipt, and each recording cannot be subsequently manipulated or changed on the blockchain. The general matters include information routinely requested by an SEC auditor, specifically: articles of incorporation, bylaws, board of director minutes, contractual obligations and commitments, lease agreements—operating or capital, purchase agreements, annual corporate filings for state regulatory purposes, employment agreements or contracts, consulting agreements or contracts, litigation matters involving the company, corporate acquisition agreements or valuation reports, debt or equity agreements, and a list of company shareholders. In some embodiments, all of these documents may be required to be stored on the immutable blockchain 124. In other embodiments, only some of these documents/information may be required to be stored on the immutable blockchain 124.

These preferred embodiments also include drafting financial and accounting matters by the publicly traded company 606 and recording the financial and accounting matters on the immutable blockchain at least every 30 days 608. Each recording comprises a time stamp of receipt, and each recording cannot be subsequently manipulated or changed. The financial and accounting matters include information routinely requested by and SEC auditor, specifically: detail trail balance, general ledger, journal entries not system generated, draft financial statements, cash flow and EPS (earnings per share) schedules, internal control and changes, cash accounts—bank statements and reconciliations as of end of period, repaid expenses—documentation of additions and period amortization/write-offs, receivables—documentation for changes from prior period and analysis of collectability, accounts payable aging, accrued expenses detail listing, notes payable, equity transactions, and revenue. In some embodiments, all of these documents may be required to be stored on the immutable blockchain 124. In other embodiments, only some of these documents/information may be required to be stored on the immutable blockchain 124. In some preferred embodiments, the note payable information includes note payable roll forward schedule with BCF calculation, note conversion calculations for all transactions during the period, and/or note agreement for outstanding notes and notes settled. In some preferred embodiments, the equity transactions include equity activity, supporting documents for all shares, options & warrants issued, valuation of any warrants or options, and stock ledger showing number of outstanding shares and listing of shareholders. In some embodiments, the revenue information includes an explanation for significant changes to revenue steam and expenses, new products or sources of revenue, changes in supply chain for inventory, and/or major customers and vendors.

Preferred embodiments also include drafting tax filing maters by the publicly traded company 610 and recording the tax filing matters on the immutable blockchain within the time requirements specified by the tax deadlines or after a material change 612. Each recording comprises a time stamp of receipt and each recording cannot be subsequently manipulated or changed. In these preferred embodiments, the tax filing matters include annual filings for federal and state tax authorities, local tax filings—sales tax; and/or employment tax filings—quarterly and annual.

Preferred embodiments also include drafting SEC filing matters by the publicly traded company 614 and recording the SEC filing matters on the immutable blockchain within the time requirements specified by the SEC deadlines or after a material change 616. Each recording comprises a time stamp of receipt and each recording cannot be subsequently manipulated or changed. In these preferred embodiments, the SEC filing matters include filing form 10K, filing form 10Q, filing form 8K, registration statements, private placement offering memorandums; and/or press releases.

Preferred embodiments also include completing SEC auditor due diligence documents by the publicly traded company 618. Some preferred embodiments also include recording the SEC auditor due diligence documents on the immutable blockchain in preparation of an SEC audit, ether after completed or after signoff by the SEC auditor at the completion of an audit. Each recording comprises a time stamp of receipt, and each recording cannot be subsequently manipulated or changed. Preferred embodiments also include creating a list of certificate holders that have at least some access to the recorded information about the publicly traded company on the immutable blockchain, designating an SEC auditor as a certificate holder 620, and providing at least some of the recorded information on the immutable blockchain to the SEC auditor for completion of a SEC financial statement audit of the public company 622. In these embodiments, the auditor is provided immutably verifiable recorded company information that is time-stamped and that cannot be subject to subsequent data entry manipulation.

Other preferred embodiments include systems and methods for preparing for a merger or acquisition and collecting and storing required and other pertinent information on an immutable blockchain. Like other embodiments, the collected merger and/or acquisition information is stored on an immutable blockchain, which is time-stamped and cannot be subsequently manipulated or changed. These embodiments apply both to public and private companies that are currently undergoing a merger or acquisition, or companies that may undergo one in the future. Information from both companies is stored on the immutable blockchain, and may include, for example, in certain preferred embodiments, certain corporate governance information and/or audit information. In some preferred embodiments, the categories of information collected and stored from both companies involved in the transaction may be the same. In other preferred embodiments, the categories of information collected and stored from both companies may be different. In some preferred embodiments, information from both companies is collected and stored at least every 30 days until close of the transaction, wherein each recording comprises a time stamp of receipt, and wherein each recording cannot be subsequently manipulated or changed. These preferred embodiments may also include drafting tax filing maters by the target companies and recording the tax filing matters on the immutable blockchain within the time requirements specified by the tax deadlines or after a material change, wherein each recording comprises a time stamp of receipt, and wherein each recording cannot be subsequently manipulated or changed.

In most preferred embodiments, financial statements must be prepared by both companies and stored on the immutable blockchain, which also includes updating these financial statements and saving them on the blockchain until the close of the transaction, before any offering of public or private securities can be made. In most preferred embodiments, these statements and disclosures used in preparation will dictate the offering terms and story into a memorandum or prospectus. In some preferred embodiments dealing with private offerings, SEC reporting information, i.e. SEC filing matters and SEC auditor documents, may not be required. However, in most preferred embodiments, officer, director and company disclosures would still need to be drafted and stored on the blockchain, which could then be made available to auditors upon their request.

Other preferred embodiments may include a private company or SPAC (special purpose acquisition company) collecting information and storing that information on an immutable blockchain when preparing for an IPO. Generally, a private company offering of a private placement of securities or assets to accredited investors is not required to disclose an audit, but current unaudited statements need to be available to investors upon request. Therefore, in some embodiments, the present systems and methods will require an audit to be stored on the immutable blockchain for reference during these transactions. In some preferred embodiments, information from the private company is collected and stored at least every 30 days until close of the transaction, wherein each recording comprises a time stamp of receipt, and wherein each recording cannot be subsequently manipulated or changed.

Other preferred embodiments may also incorporate similar aspects of the disclosed systems and methods, i.e. drafting and storing pertinent information on an immutable blockchain, and may facilitate a wide range of related transactions. For example, all SEC, State or Federal regulated offerings, that require pre-filing, post-filing or are exempted from registration, have some level of offering documentation and financial reporting requirement to the SEC and/or public and private shareholders. In this regard, the present invention of storing information on an immutable blockchain may also include: (1) a public to public—secondary offering; (2) public to private offering—private placement of discounted restricted securities, made available to accredited investors only; (3) private to public offering, i.e. IPO-SPAC; and (4) private to private offering, i.e. pre-IPO, gen/limited partnership, private placement of securities, assets or income producing assets, made available to accredited investors only. These embodiments may function similarly to previously disclosed systems and methods of the present inventions, for example, by drafting the required documentation necessary to complete the transaction by all parties involved, adhering to any timeliness requirements, and storing the pertinent information on an immutable blockchain for verification and review by any third parties.

Other embodiments include systems and methods of recording a certified track record for trading stock and commodities on an immutable blockchain. These embodiments disclose storing pertinent trading information on an immutable blockchain for preparing for, and complying with, a third party certified accounting method for recording stock or commodity executed trades. The recorded information, which cannot be subsequently backdated or manipulated, provides third party auditable compliant and accurate information, which certifies the track record. These systems and methods are useful to traders who need an objective way to prove their trading track record, which when stored on an immutable blockchain, is not subject to manipulation. For example, these embodiments include recording the trading and execution on the immutable blockchain immediately and at least every day a trade is executed with cumulative totals daily at market close, wherein each recording comprises a time stamp of receipt. In some preferred embodiments, the recordings include the type of stock or commodity bought or sold, the price, number of shares, profits or losses, holding period, etc. By recording this information on the blockchain, a trader can track and provide information related to successful trading patterns, history, overall performance, sector performance, etc., which may be necessary to attract new and/or additional investment.

All directional references (e.g. top, bottom, front, back) are only used for identification purposes to aid the reader's understanding of the embodiments of the present invention, and do not create limitations, particularly as to the position, orientation, or use of the invention unless specifically set forth in the claims. Joinder references (e.g. attached, coupled, connected, and the like) are to be construed broadly and may include intermediate members between a connection of elements and relative movement between elements. As such, joinder references do not necessarily infer that two elements are directly connected and in fixed relation to each other.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The above-described benefits, embodiments, and/or characterizations are not necessarily complete or exhaustive, and in particular, as to the patentable subject matter disclosed herein. Other benefits, embodiments, and/or characterizations of the present invention are possible.

What is claimed:

1. A computer-implemented method for trading equities on an immutable blockchain, the method comprising:
   in real time, with trading software executing on a digital trading platform:
      inviting at least one customer of at least one broker dealer to:
         participate as a user on the digital trading platform; and
         take at least one action, wherein the at least one action comprises placement of at least one of an order, bid or offer pertaining to the equities;
      receiving the at least one of an order, bid or offer, wherein the at least one of the order, bid or offer comprises at least one digital price;
      encrypting at least a portion of the at least one of an order, bid or offer as encrypted data, wherein the at least a portion comprises personally identifiable information, such that the personally identifiable information is accessible only with a decryption key;
      storing the encrypted data and the at least one digital price on a blockchain, such that the at least one of an order, bid or offer is cash immutable and creates an immutably verifiable record that is time-stamped and that cannot be subject to subsequent data entry manipulation;
      providing a quote of the at least one digital price in order to facilitate at least one transaction;
      regulating the at least one transaction by providing at least some access of the at least one transaction on the digital trading platform to at least one governing entity;
      completing the at least one transaction by integrating with an existing brokerage ecosystem; and
      charging the at least one broker dealer for facilitating the invitation of the at least one customer to use the digital trading platform.

2. The method of claim 1, wherein the equities that are traded on the immutable blockchain are registered.

3. The method of claim 1, wherein the at least one governing entity is the Securities and Exchange Commission (SEC).

4. The method of claim 1, wherein the at least one governing entity is the Financial Industry Regulatory Authority (FINRA).

5. The method of claim 1, wherein the at least one of an order, bid or offer is entered into the software by the at least one broker dealer.

6. The method of claim 1, wherein the at least one of an order, bid or offer is entered into the software directly by the user.

7. The method of claim 1, wherein the existing brokerage ecosystem further comprises at least one order entry process.

8. The method of claim 1, wherein the existing brokerage ecosystem further comprises priority rules.

9. The method of claim 1, wherein the existing brokerage ecosystem further comprises execution procedures.

10. The method of claim 1, wherein the at least one governing entity is provided with a single data interface and consolidated history of the at least one transaction.

11. The method of claim 1, wherein the at least one broker dealer is charged a fixed fee for facilitating the at least one transaction on the digital trading platform.

12. The method of claim 1, wherein the broker dealer complies with applicable exchange and reporting rules and regulations.

13. The method of claim 1, wherein the immutable blockchain comprises technology that prevents order manipulation.

14. The method of claim 1, wherein the existing brokerage ecosystem comprises a spot market.

15. The method of claim 14, wherein the spot market is decentralized.

16. The method of claim 1, further comprising cryptographically verifying the at least one of an order, bid or offer on the blockchain.

17. The method of claim 1, wherein the at least one of an order, bid or offer comprises a bid, ask, trade, cancellation, or modification.

18. The method of claim 1, further comprising encrypting personally identifiable information regarding the at least one customer such that only certificate holders can access the personally identifiable information.

19. The method of claim 1, further comprising accessing or reviewing the at least one digital price on the blockchain.

20. The method of claim 1, further comprising storing transaction data regarding the least one of an order, bid or offer on a cloud server different than the blockchain.

21. The method of claim 1, wherein the equities comprise stock shares, debts, notes payable, equity agreements, options, or warrants.

\* \* \* \* \*